United States Patent [19]

Aihara et al.

[11] 4,056,680

[45] Nov. 1, 1977

[54] TERMINATION OF D.C. HIGH TENSION ELECTRIC CABLES AND METHOD OF MANUFACTURING SAME

[75] Inventors: Mitsugu Aihara, Yokohama; Yutaka Kogane, Kawasaki; Yasumitsu Ebinuma, Tokyo; Masaki Minami, Yokohama, all of Japan

[73] Assignee: Showa Electric Wire & Cable Co., Ltd., Kawasaki, Japan

[21] Appl. No.: 674,163

[22] Filed: Apr. 6, 1976

[30] Foreign Application Priority Data

Apr. 11, 1975 Japan .................................. 50-43941

[51] Int. Cl.² ....................... H02G 15/22; H02G 1/14; H02G 15/24; G01R 31/20
[52] U.S. Cl. ........................................ 174/19; 29/628; 156/48; 156/49; 174/21 R; 174/73 R; 324/54
[58] Field of Search ............... 174/19, 20, 21 R, 21 C, 174/22 R, 22 C, 25 R, 25 C, 73 R, 73 SC; 324/54; 156/48, 49; 29/624, 628

[56] References Cited

U.S. PATENT DOCUMENTS 3,631,519  12/1971  Salahshourian ................... 174/73 R

FOREIGN PATENT DOCUMENTS

| 850,517 | 10/1960 | United Kingdom | 174/19 |
| 930,017 | 7/1963 | United Kingdom | 174/73 R |
| 1,147,827 | 4/1969 | United Kingdom | 174/73 R |

*Primary Examiner*—Laramie E. Askin
*Attorney, Agent, or Firm*—Lane, Aitken, Dunner & Ziems

[57] ABSTRACT

A d.c. high tension cable termination or joint and method of manufacturing same is described. The cable comprises an electric conductor, an electrically insulating layer which is concentrically applied over the conductor, and a semi-conductive layer which is concentrically applied over the insulating layer in close contact therewith. The cable termination or joint comprises an electrically insulating liquid impregnated into a portion of the semi-conductive layer which is located adjacent to an end of the insulating layer so as to present an electrical resistance which is higher than that of the non-impregnated portion of the semi-conductive layer but is lower than that of the insulating layer. The electric conductor is electrically connected with the end of that portion of the semi-conductive layer impregnated with the insulating liquid which is located nearer the conductor.

15 Claims, 3 Drawing Figures

ALUMINUM FOIL
CONNECTING 6 TO A

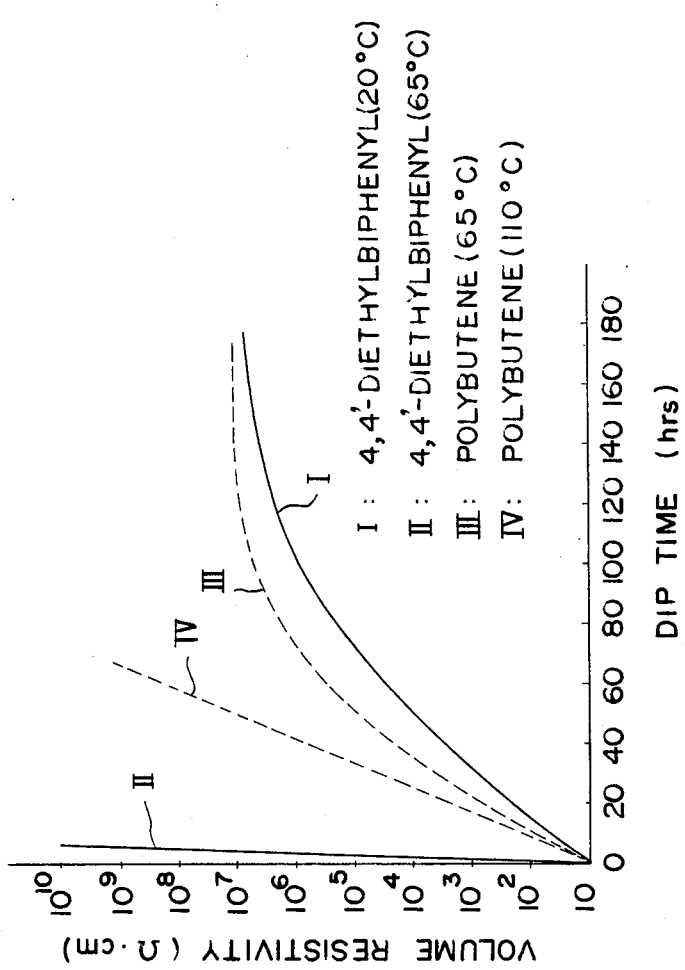

TERMINATION OF D.C. HIGH TENSION ELECTRIC CABLES AND METHOD OF MANUFACTURING SAME

BACKGROUND OF THE INVENTION

The invention relates to a d.c. high tension cable termination or joint and a method of manufacturing same.

As is well recognized, a resistive termination is used in the end of a d.c. high tension cable in order to prevent stress concentration between the outer shield layer and the conductor of the cable. Such a resistive termination is formed by stripping off the protective sheath, semi-conductive layer and insulating layer of the cable in a sequentially stepped manner, and wrapping a self-fusing tape having a volume resistivity on the order of $10^{10}\Omega$.cm on the resulting exposed insulating layer so as to extend across the semi-conductive layer and the cable conductor. However, to provide such a resistive termination, a certain degree of skill is required in stripping off the semi-conductive layer so as not to damage the insulating layer. In addition, a small wedge-shaped gap is apt to be formed between the end of the semi-conductive layer and the wrapped layer of the self-fusing tape to cause an electrical defect at such location or locations.

SUMMARY OF THE INVENTION

It is an object of the invention to provide a d.c. high tension cable termination or a joint, a kind of the termination, having an increased dielectric breakdown strength.

It is another object of the invention to provide a d.c. high tension cable termination or joint and a method of manufacturing same which does not require the stripping of the semi-conductive layer when the termination is formed.

It is a further object of the invention to provide a d.c. high tension cable termination or joint which is preferred for use in the dielectric breakdown test of the cables.

In accordance with the invention, there is provided a d.c. high tension cable termination comprising an electric conductor, an electrically insulating layer which is concentrically applied over the electric conductor, and a semi-conductive layer concentrically applied over the insulating layer in close contact therewith, the semi-conductive layer including a portion contiguous with an end of the insulating layer and impregnated with an electrically insulating liquid so as to present an electrical resistance which is higher than that of the remaining non-impregnated portion of the semi-conductive layer but is lower than that of the insulating layer, the electric conductor being electrically connected with that end of the semi-conductive layer impregnated with the insulating liquid which is located nearer the electric conductor.

These and other objects of the invention will become apparent from the following description of embodiments thereof when taken together with the drawings.

BRIEF DESCRIPTION OF THE DRAWINGS

FIG. 2 graphically shows the relationship between the volume resistivity and the dip time when the semi-conductive layer of the cable is immersed or dipped into an insulating oil.

DETAILED DESCRIPTION OF PREFERRED EMBODIMENTS

Figure 1:
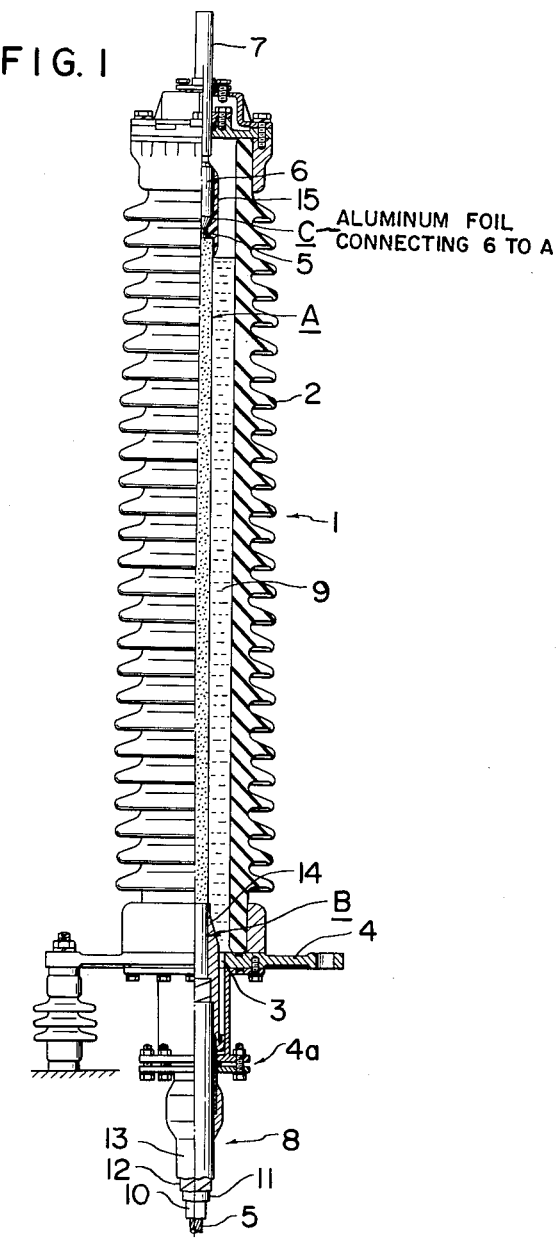
FIG. 1 is a side elevation, partially in section, of a cable termination constructed in accordance with one embodiment of the invention.

Referring to FIG. 1, a cable termination constructed in accordance with one embodiment of the invention is generally shown by numeral 1, and essentially comprises a casing formed by a porcelain tube 2 or a similar tube of a thermosetting resin, a lower fixture 4 secured to the bottom of the porcelain tube 2 and having a cable passageway 3 formed centrally therein, a d.c. high tension cable 8 inserted into the procelain tube through the lower fixture 4 and including a conductor 5 which is electrically connected through a connection sleeve 6 with an output conductor 7 which is secured to the top end of the porcelain tube 2, and an insulating composition 9 which fills the space between the porcelain tube and the cable 8. As illustrated in the lower portion of FIG. 1, the cable 8 comprises an insulating layer 10 of a solid type having a volume resistivity of above $10^{16}\Omega$.cm, for example, which may be formed of rubber or plastics such as polyethylene, ethylene-propylene-terpolymer, butyl rubber or the like, or preferably cross-linked polyethylene. In addition, the cable comprises a uniform semi-conductive layer 11 of a semi-conductive composition which is disposed in close contact with the insulating layer, a shield layer 12 formed by a winding of copper tape, and a protective sheath 13 which may be formed by extrusion of vinylchloride resin composition, for example, all of which are sequentially applied in concentric manner.

At one end of the cable 8, the protective sheath 13 is stripped off for a given length, and then the shield layer 12 is also stripped off, but for a length which is slightly less than the stripped length of the sheath 13. The end of the protective sheath 13 is supported by a clamp 4a secured to the lower fixture 4. The semi-conductive layer 11 is exposed within the porcelain tube 2. This end of the semi-conductive layer 11 is only slightly removed as insulating layer 10, thus exposing the conductor 5.

The semi-conductive mixture represents a composition having a volume resistivity which is less than $10^5\Omega$.cm or preferably less than $10^2\Omega$.cm. It may be formed as a resin based material such as ethylene-vinylacetate-copolymer, chlorinated polyethylene or ethylene-acrylate-copolymer, blended with 30 to 60 parts by weight of conductive carbon per 100 parts by weight of resin. Preferably, the semi-conductive layer 11 is applied over the insulating layer 10 by extrusion and is cross-linked together with te insulating layer. The cross-linkage takes place by admixing 0.5 to 5 parts by weight of cross linking peroxide such as di-α-cumyl peroxide (DCP) per 100 parts by weight of resin to the semi-conductive composition, extruding the composition at a temperature below the decomposition temperature of the cross linking peroxide, and subsequently thermally treating extruded material at a temperature above the decomposition temperature.

An area A of the semi-conductive layer 11 which is in contact with the insulating composition 9 is impregnated with an insulating liquid prior to the assembly of the cable termination so as to achieve a volume resistivity of from $10^7$ to $10^{13}\Omega$.cm, preferably $10^9$ to $10^{11}\Omega$.cm. In this manner, the impregnated area A of the semi-conductive layer presents a specific volume resistivity which is higher than that of the remainder or non-impregnated portion B and which is lower than that of the insulating layer 10. An insulating liquid suitable for this purpose includes aliphatic synthetic insulating oil such as polybutene, aromatic synthetic insulating oil such as 4.4′-diethylbiphenyl, triphenyl or hydrogenated triphenyl or natural mineral oil containing at least 65 per cent of such aromatic ingredient, all of which have a boiling point of or above 200° C. The impregnation of the semi-conductive layer 11 with the insulating liquid takes place by stripping the individual layers in a stepped manner from the end of the cable before the termination is assembled, and dipping the necessary portion of the semi-conductive layer 11 into the insulating liquid which is heated to a temperature between 60° and 70° C until the layer is sufficiently impregnated with the liquid to present a volume resistivity of $10^7$ to $10^{13} \Omega.cm$. The rate at which the volume resistivity of the semi-conductive layer 11 increases, or the rate at which the insulating fluid penetrates into the semi-conductive layer 11 depends on the kind of the insulating liquid and also on the temperature, as illustrated graphically in FIG. 2. Generally, the rate of penetration is higher with an aromatic insulating oil than with an aliphatic insulating oil, and hence the working time can be advantageously reduced by utilizing such an aromatic insulating oil. The base polymer of the semi-conductive composition presents a volume resistivity on the order of $10^{14} \Omega.cm$, but since the conductive carbon is blended therewith, the resistivity which might result from an excessive impregnation with the insulating liquid cannot exceed $10^{13} \Omega.cm$.

Where the semi-conductive layer is not previously cross-linked, it is preferable to prevent the dissolution of the material of the semi-conductive layer into the insulating liquid prior to the initiation of the impregnation therewith. This may be accomplished by coating the outer periphery of the semi-conductive layer with DCP which is fused under heat, and sequentially wrapping tetrafluoroethylene tape and polyester tape as retaining tapes, and subsequently applying heating means such as band heater thereon to apply heat thereto to cause a cross-linkage of the semi-conductive layer. Alternatively, a woven fabric such as gauze or a non-woven fabric tape which comprises an insoluble fibre may be wrapped around the outer periphery of the semi-conductive layer.

An oil inhibitor 14 is formed so as to extend from the area B of the semi-conductive layer 11 which is not impregnated with the insulating liquid to the protective sheath 13. The oil inhibitor 14 is formed by wrapping a plurality of tiers of a laminate film which comprises an aluminium foil fused with a polyethylene film on its one surface, heating the assembly to fuse the materials together, followed by wrapping a self-fusing tape thereon.

Aluminium foil C is wrapped around the junction between the connection sleeve 6 and the end of the semi-conductive layer 11 in the area A which is impregnated with the insulating liquid, and a self-fusing tape 15 is disposed thereon. In this instance, the electric conductor 5 is electrically connected through the aluminum foil C with the end of the impregnated area A of th semi-conductive layer which is located nearer the conductor.

A suitable material for the insulating composition 9 includes a viscous insulating liquid such as polybutene, which has little or no penetration into the semi-conductive layer 11 at room temperatures, and which preferably has no extracting effect on the insulating liquid which is impregnated into the area A of the semi-conductive layer 11. If required, the insulating composition 9 may be replaced by an insulating gas such as $SF_6$. Such filling is effective to prevent a creeping discharge.

With the cable termination according to the invention, the area A of the semi-conductive layer 11 which is impregnated with the insulating liquid presents a volume resistivity which is higher than that of the non-impregnated area B thereof and which is lower than the volume resistivity of the insulating layer 10. Due to this fact combined with the fact that the end of the area A is electrically connected with the conductor 5, the stress concentration in the cable termination is greatly reduced by forming such a resistive termination, considerably improving the dielectric breakdown strength of the termination.

While in the embodiment shown, the casing formed by the porcelain tube 2 is shown as covering the entire cable termination, it is not necessary that the casing covers the exposed conductor portion but may have a size which depends on the quantity of the insulating mixture, since the concentration of the electric field is most notable at the juncture or boundary between the areas A and B of the semi-conductive layer 11 which preferably should be covered by a filling of the insulating mixture 9.

In one example, when the cable termination according to the invention is implemented in a 66kV cable having a cross-sectional area of 1000mm² for the conductor and insulated with a cross-linked polyethylene to a thickness of 14mm, there is obtained a withstand voltage value in excess of 640kV at a creeping distance of 170cm.

Figure 3:
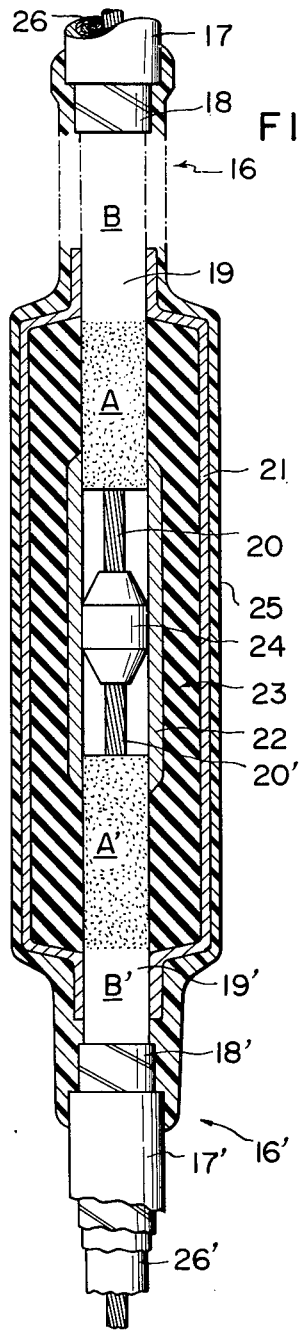
FIG. 3 is a fragmentary longitudinal ection of another embodiment of the invention which is constructed as a cable joint.

While the invention has been described above as applied to a cable termination, it should be understood that is not limited to such application, but may be applied to a joint between a pair of d.c. high tension cables 16 and 16′ as illustrated in FIG. 3. Specifically, protective sheath 17, 17′ and shield layers 18, 18′ of copper tape are removed in a stepped manner from the respective ends of the cables 16, 16′, and semi-conductive layers 19, 19′ and insulating layers 26, 26′ are also removed for a short length to expose conductors 20, 20′. Selected portions A, A′ of the semi-conductive layers 19, 19′ are impregnated with an insulating liquid so as to exhibit a given volume resistivity. Subsequently, a pair of outer and inner semi-conductive layers 21, 22 which surround the semi-conductive layers 19, 19′, respectively are temporarily fitted over one of the cables, and a premolded strengthening member 23 of an insulating material such as ethylene-propylene-terpolymer is fitted between the layers 21, 22. Conductors 20, 20′ are then connected together through a connection sleeve 24, and subsequently the pair of cylindrical semi-conductive layers 21, 22 as well as the insulating strengthening members 23 which have been fitted on one of the cables are slid back so as to cover the conductor interconnection. An adhesive tape 25 is wrapped around the outer layer 21. It is desirable that the length of the areas A, A′ of the semi-conductive layers which are impregnated with the insulating liquid be chosen so that the semi-conductive layer 21 is brought into contact with the areas B, B′ of the semi-conductive layers 19, 1′ which are not impregnated with the insulating liquid.

In this instance, the electric conductors 20, 20′ are electrically connected through the semi-conductive layer 22 respectively with the end of the impregnated area A, A' of the semi-conductive layer which is located nearer the conductor.

From the foregoing description, it will be appreciated that with the cable termination or joint and the method of manufacturing same according to the invention, formation of an air gap between the semiconductive layer is avoided during the formation of the resistive termination, thereby enhancing the dielectric breakdown strength. In addition, there is no need to strip off the semi-conductive layer, thus avoiding the possibility of inadvertently damaging the insulating material. The elimination of the stripping off of the semi-conductive layer which in the prior art required a certain degree of skill greatly contributes to the ease of forming the termination or joint. It should be noted that in the dielectric breakdown test of high tension cables, a dielectric breakdown is frequently caused in the termination where the electric field is non-uniform, presenting a difficulty in the determination of a true dielectric breakdown strength of the cable. However, the cable termination of the invention provides a stabilized dielectric breakdown strength response, so that the cable termination according to the invention is particularly suitable for use as a cable termination for d.c. testing purposes.

Having described the invention, what is claimed is:

1. A d.c. high tension cable termination comprising an electric conductor, an electrically insulating layer concentrically applied over the electric conductor, and a semi-conductive layer concentrically applied over the insulating layer in close contact therewith, the semi-conductive layer including an area adjacent to an end of the insulating layer which is impregnated with an electrically insulating liquid so as to present an electrical resistivity which is higher than that of the remainder of the semi-conductive layer which is not impregnated with the liquid and which is lower than that of the insulating layer, the electric conductor being electrically connected with that end of the impregnated area of the semi-conductive layer which is located nearer the conductor.

2. A d.c. tension cable termination according to claim 1 in which the semi-conductive layer comprises a compostion containing a conductive carbon and which is extruded on the insulating layer.

3. A d.c. high tension cable termination according to claim 1 in which the area of the semi-conductive layer which is impregnated with the insulating liquid presents a volume resistivity from $10^7$ to $10^{13} \Omega.cm$, preferably from $10^9$ to $10^{11} \Omega.cm$ while te remaining portion of the semi-conductive layer which is not impregnated with the liquid presents a volume resistivity less than $10^4 \Omega.cm$, preferably less than $10^2 \Omega.cm$.

4. A d.c. high tension cable termination according to claim 1 in which the electrically insulating liquid comprises an electrically insulating oil having a boiling point of or above 200° C and containing at least 65 per cent of aromatic insulating oil.

5. A d.c. high tension cable termination according to claim 1 in which the semi-conductive layer is based on a cross-linked resinous material.

6. A d.c. high tension cable termination according to claim 1, further including a casing which is located so as to surround at least a boundary between the impregnated area and non-impregnated area of the semi-conductive layer, an insulating fluid filling the space between the semi-conductive layer and the casing.

7. A d.c. high tension cable termination according to claim 6 in which the insulating fluid comprises a viscous insulating liquid such as polybutene which has no or little penetration into the semi-conductive layer at room temperatures and which has no extracting effect on the insulating liquid which is impregnated into the semi-conductive layer.

8. A d.c. high tension cable termination according to claim 6 in which the insulating fluid comprises an insulating gas such as $SF_6$.

9. A method of forming a termination for a d.c. high tension cable which includes an electric conductor successively covered in concentric manner with an electrically insulating layer, a semi-conductive layer, and at least one additional layer, the method comprising the steps of stripping the additional layer or layers from an end of the cable to expose the semi-conductive layer, applying an electrically insulating liquid to an exposed area of the semi-conductive layer which is located adjacent to a cable end to impregnate the semi-conductive layer with the liquid, and electrically connecting the impregnated semi-conductive layer with the conductor.

10. A method of forming a termination according to claim 9 in which an exposed area of the semi-conductive layer located adjacent to a cable end is dipped into the electrically insulating liquid to impregnate the semi-conductive layer with the liquid.

11. A method of forming a termination according to claim 10 in which the semi-conductive layer comprises a cross-linked polymer material containing conductive carbon.

12. A method of forming a termination according to claim 10, further including the step of wrapping a tape of woven or non-woven fabric around the semi-conductive layer before an exposed area of the semi-conductive layer adjacent to a cable end is dipped into the electrically insulating liquid.

13. A method of forming a termination affording to claim 9 in which the semi-conductive layer is impregnated with the electrically insulating liquid in an amount which yields a volume resistivity of the semi-conductive layer of from $10^7$ to $10^{13} \Omega.cm$, preferably from $10^9$ to $10^{11} \Omega.cm$.

14. A method of forming a termination according to claim 9 in which the electrically insulating liquid is heated to a temperature between 60° and 70° C.

15. A method of forming a termination according to claim 9 in which the electrically insulating liquid comprises an electrically insulating oil having a boiling point of or above 200° C and containing at least 65 per cent of aromatic insulating oil.

* * * * *

UNITED STATES PATENT AND TRADEMARK OFFICE
CERTIFICATE OF CORRECTION

PATENT NO. : 4,056,680
DATED : November 1, 1977
INVENTOR(S) : Aihara et al

It is certified that error appears in the above-identified patent and that said Letters Patent are hereby corrected as shown below:

Column 2, line 3, change "ection" to read --section--;
          line 44, after "as" insert --is--;
          line 54, change "te" to read --the--.

Column 3, line 63, change "th" to read --the--.

Column 4, line 65, change "19,1'" to read --19, 19'--.

Column 5, line 44, after "d.c." insert --high--;
          line 53, change "te" to read --the--.

Column 6, line 47, change "affording" to --according--.

Signed and Sealed this

Eleventh Day of April 1978

[SEAL]

Attest:

RUTH C. MASON
Attesting Officer

LUTRELLE F. PARKER
Acting Commissioner of Patents and Trademarks